W. A. BUCHANAN.
THILL COUPLING.
APPLICATION FILED SEPT. 19, 1917.
1,287,213.
Patented Dec. 10, 1918.
2 SHEETS—SHEET 2.
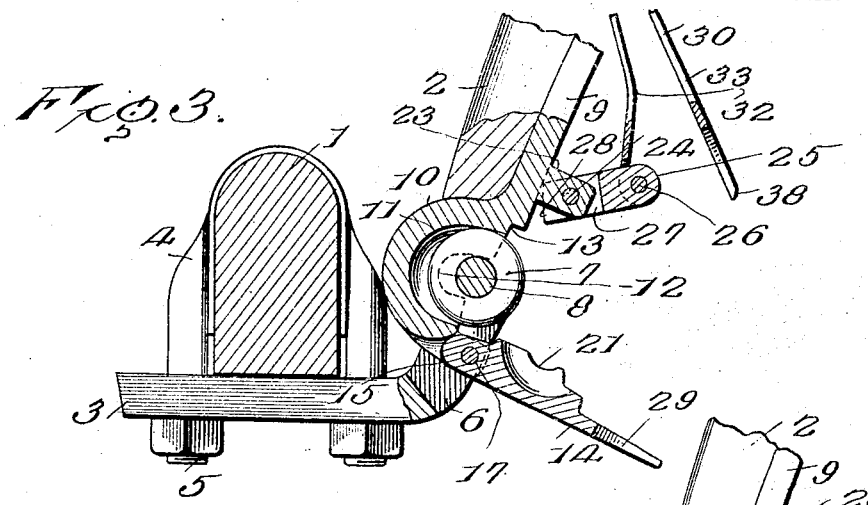
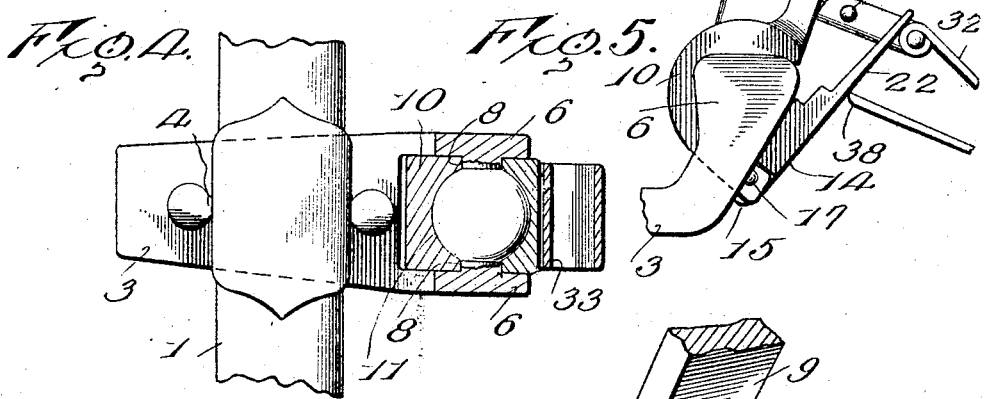
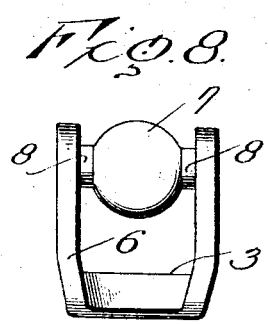
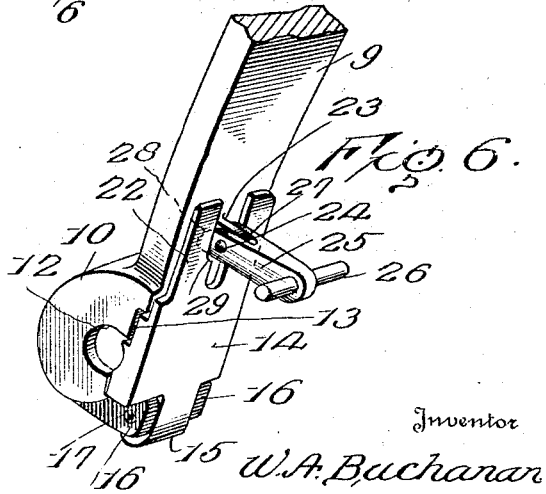
Inventor
W. A. Buchanan
By
Attorneys

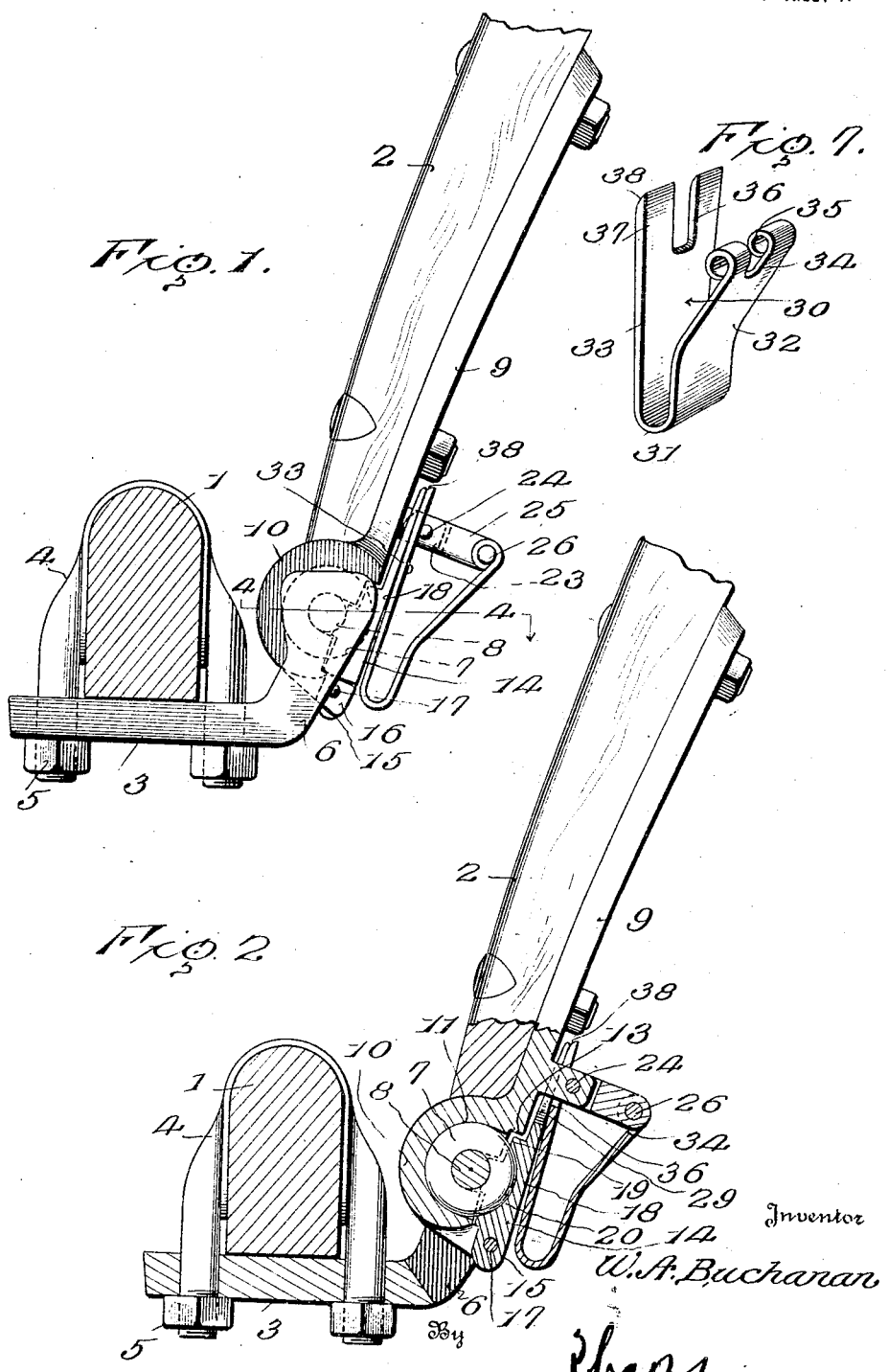

UNITED STATES PATENT OFFICE.

WILLIAM A. BUCHANAN, OF ASHEVILLE, NORTH CAROLINA.

THILL-COUPLING.

1,287,213.  Specification of Letters Patent.  Patented Dec. 10, 1918.

Application filed September 19, 1917. Serial No. 192,167.

*To all whom it may concern:*

Be it known that I, WILLIAM A. BUCHANAN, citizen of the United States, residing at Asheville, in the county of Buncombe and State of North Carolina, have invented certain new and useful Improvements in Thill-Couplings, of which the following is a specification.

This invention relates to thill couplings of the antirattling type and has as its primary aim to provide a thill coupling which may be readily and quickly connected with and disconnected from the axle and yet will be entirely safe to use inasmuch as it cannot possibly become unlocked even though the vehicle be driven through brush or over other obstructions. The objection to thill couplings now in use is that in driving through brush or over other obstructions, or in backing the vehicle in brush, the coupling is liable to become unlocked and if this fact is not noticed a runaway is likely to be subseqeuntly caused because of one or both of the thills becoming detached from the axle. It is above all desirable therefore that a thill coupling shall be so constructed that it cannot become accidentally unlocked under any conditions whatsoever and that even should it be mischievously unlocked and this fact not be noticed or should the user himself forget to lock the same the coupling will not become disconnected from the shaft. The invention, therefore, has as its object to provide a thill coupling so constructed that these results will be obtained so that runaways from the causes above mentioned will be entirely prevented and it will not be necessary to frequently inspect the coupling to ascertain its condition when driving over rough roads or obstructions or through brush or the like. In order that the thill coupling embodying the present invention may possess the advantages above referred to, the invention contemplates that the coupling shall be so constructed that the locking element thereof will be located wholly forwardly of the axle and beneath the thill iron and above the under side of the axle and that the thill member of the coupling shall be so formed that it cannot become disconnected from the axle member of the coupling until the forward or tip ends of the thills have been lowered to a position substantially touching the ground. Therefore, by reason of such construction even should the vehicle be backed in brush or over obstructions, the axle itself will serve as a fender to prevent the brush or obstructions coming in contact with the locking member of the coupling in such manner as to move the same to unlocked position and even should the coupling be mischievously unlocked or should the user forget to lock the same the thills cannot possibly become disconnected from the axle as in driving their forward or tip ends never, of course, become lowered to such position as mentioned above.

Another aim of the invention is to provide a thill coupling, the locking member of which is in the nature of a bowed spring and to so mount the said member and so construct the same that it will not be liable to be weakened should it come into contact with obstructions.

Another aim of the invention is to so construct the thill coupling that all of the pulling strain and, in fact, any strain incident to backing of the vehicle will be borne by the fixed or rigid element of the thill member of the coupling so that the cap element which serves to prevent rattling will be relieved of strain and will merely serve to firmly hold the ball element of the axle member of the coupling in its seat in the socket which is formed in the said fixed element of the thill member of the coupling.

In the accompanying drawings:

Figure 1 is a side elevation of the coupling embodying the present invention, the same being shown locked;

Fig. 2 is a vertical front to rear sectional view therethrough in locked condition;

Fig. 3 is a similar view but illustrating the coupling unlocked prior to disconnection of the thill from the axle;

Fig. 4 is a horizontal sectional view on the line 4—4 of Fig. 1;

Fig. 5 is a view similar to Fig. 3 but illustrating the positions the parts of the coupling would occupy if the same were mischievously unlocked or if the user forgot to lock the same after connecting the thill with the axle;

Fig. 6 is a perspective view of a portion of the thill member of the coupling;

Fig. 7 is a similar view of the locking member;

Fig. 8 is a front elevation of the axle member of the coupling.

In the drawings, the numeral 1 indicates a vehicle axle, and 2 one of the thills. The coupling embodying the present invention includes an axle member and a thill member, and the said axle member comprises an attaching plate 3 which is disposed against the under side of the axle 1 and secured in place by means of an axle embracing clip 4, the arms of which extend downwardly through the said plate and are provided with nuts 5 which are tightened to bear against the under side of the said plate. Projecting forwardly and upwardly from the plate 3 are spaced arms 6 between the ends of which is supported a spherical head 7 which constitutes the ball element of the coupling, the said element being united to the arms by means of diametrically oppositely located trunnion portions 8. The spherical head 7 is designed to be received within a socket which forms a part of the thill member of the coupling which member will now be described.

The thill member of the coupling includes a thill iron 9 which is bolted or otherwise secured to the under side of the thill 2 and which at its inner end is formed with a head 10, the under or forward side of which is substantially flat and occupies approximately the plane of the corresponding side of the thill iron 9, the said head being upwardly bulged relative to the plane of the said iron. In its under or forward side the head 10 is formed with a socket 11, the inner portion of which is substantially semi-spherical so as to snugly receive the ball or head 7 of the first described member of the coupling. However, the socket 11 is relatively deep and, in fact, of a depth approximately equal to the diameter of the head 7 so that the said head is practically completely housed within the socket. The opposite sides of the head 10 are formed with notches 12 which at their inner ends are substantially semi-circular so as to snugly embrace the rear sides of the trunnion portions 8, the notches, however, being relatively deep as in the instance of the socket 11 so that, as stated, the head 7 may snugly seat within the inner end of the socket 11. As stated above, the under or forward face of the head 10 is substantially flat and occupies substantially the same plane as the corresponding face of the iron 11. However, the said face of the head is formed with a relatively shallow recess 13 which extends the entire width of the said face and forwardly and rearwardly beyond the open side of the socket 11 and the purpose of this recess will presently be explained. The socket 11 is designed to be closed by a cap plate 14 which is formed at one end with a pintle lug 15 seating between pintle ears 16 formed upon the under or forward face of the head 10, a pivot pin 17 being passed through the said ears and the lug 15. That face of the cap plate 14 which is presented forwardly in the locked position of the plate and which is indicated by the numeral 18, is preferably flat throughout the length of the said plate. The opposite or inner face of the plate, however, is formed with a shallow boss which extends from side to side of the said plate and which is of such dimensions lengthwise of the plate as to more or less snugly seat within the open side of the socket 11 when the plate is in locked position. The face of the boss 19 is formed with a shallow socket 20 which is of spherical contour and which is designed to snugly receive the outer or forward side of the head 7 when the members of the coupling are assembled and the coupling is locked. It will now be understood and particularly by reference to Fig. 2 of the drawings, that the sockets 11 and 20 coact to form a substantially spherical seat for the ball or head 7 of the axle member of the coupling. It will also be observed that the wall of the socket 20 is formed at diametrically opposite sides with notches 21 which oppose the notches 12 when the coupling is closed and which coact with the latter notches to provide substantially circular openings receiving the trunnion portions 8 of the said axle member of the coupling. By reference particularly to Figs. 2 and 6 of the drawings it will be observed that the outer or free portion of the cap plate 14 rests at its inner end, in the closed position of the cap plate, against the outer or forward face of the iron 9 forwardly beyond the open side of the socket 11, this portion of the cap plate being indicated by the numeral 22. By reference to Figs. 2 and 4 of the drawings it will be understood that when inward pressure is exerted against the cap plate 19, the walls of the sockets 11 and 20 will snugly contact the surface of the head or ball 7, thereby effectually preventing rattling of the ball within the socket and yet permitting of pivotal movement to provide for up and down movement of the thill and in order that such pressure may be exerted, means is provided which will now be described.

Formed upon the outer face of the thill iron 9 is a pivot ear 23 to which is pivotally connected, as at 24, the inner end of a link 25, the link being formed at its said end with spaced portions which straddle the said ear 23, as clearly shown in Fig. 6. At its outer end this link is provided with a transverse pin 26, the ends of which project beyond the opposite sides of the said link. The spaced portions at the inner end of the link 25, which portions are indicated by the numeral 28, have their extremities obliquely cut, as at 27, or beveled so that while the link may have upward swinging movement upon its pivot 24, its downward swinging movement is limited by the engagement of the higher points of the oblique extremities 27 against the face of the thill iron 9. Thus the link cannot swing downwardly beyond the position shown in Figs. 2 and 5 of the drawings, although it may swing upwardly, as above stated, substantially to the position shown in Fig. 3, so as to provide clearance for the cap plate in swinging the latter into and out of locking position. Specifically, so far as the link 25 itself is concerned, the free end of the cap plate 14 may readily pass the same due to the formation in the portion 22 of the cap plate of a notch 29 which is of a width slightly greater than the thickness of the link 25. The formation of this notch, of course, divides the portion 22 so that the spaced parts thereof lie at opposite sides of the pivot ear 23 in the closed position of the cap plate and it is against these spaced parts of the portion 22 of the said plate that the locking member of the coupling is designed to firmly bear. The locking member above referred to is preferably in the nature of a stout leaf spring, indicated in general by the numeral 30, which leaf spring is bowed between its ends, as at 31, to form spaced portions 32 and 33 which gradually diverge from the bow 31 to the ends of the spring. The end of the portion 32 of the spring is bifurcated as at 34, and the spaced portions thus formed are bent to provide pintle eyes 35 which are pivotally engaged with the projecting ends of the pin 26. In this manner the locking member comprising the spring 30, is pivotally connected with the end of the link 25 and may be swung into and out of locking position. The portion 33 of the spring is bifurcated at its outer end, as indicated by the numeral 36, so as to form spaced fingers 37 which have their extremities beveled as at 38. Assuming now that the parts are in the position shown in Fig. 5 of the drawings, it is only necessary, in closing the coupling, to press inwardly against the bow 31 of the spring 30, or in other words, in the direction of the head 10. The beveled ends 38 of the fingers 37 being in engagement with the outer face of the cap plate 14, the fingers will ride upwardly over the said face of the plate, as pressure is thus exerted, until the fingers straddle the inner end of the link 25 and bear firmly against the portion 22 of the said cap plate, as clearly shown in Figs. 1 and 2 of the drawings. It will be observed that the bow 31 of the spring locking member 30 is located above the plane of the under side of the axle 1 and that the entire locking member is located bodily above this plane and forwardly of the axle and in position forwardly of and, in a sense, beneath the thill so that even should the vehicle be backed in brush or in the presence of obstructions, there will be no likelihood of the locking member being moved to release or unlocked position inasmuch as the brush or obstructions must first engage the axle 1 and the said axle, therefore, acts as a fender as does also the lower portion of the thill iron. Of course, in traveling forwardly there will be no tendency for obstructions or brush to accidentally release the locking member as the member must be swung forwardly in order to unlock the coupling. It will also be understood and particularly by reference to Fig. 5 of the drawings, that even should the locking member be mischievously swung to release position, as shown in the said figure, or should the user of the coupling forget to lock the coupling, the coupling would still, in effect, be closed inasmuch as the link 25 will drop by gravity to the position shown in the said figure, in which position of the link the spaced parts of the portion 22 of the cap plate 14 will rest upon the pintle eyes 35 of the locking member, thus preventing the cap plate swinging down to full open position. Furthermore, the tendency of the locking member to swing downwardly by gravity upon its pivot 26, will bring the ends of the fingers 37 to position against the under or outer face of the cap plate thus further insuring against dropping of the said plate to full open position. It will, furthermore, be apparent by reference to the said Fig. 5 that inasmuch as the head 7 is practically entirely housed within the socket 11, and inasmuch as it is necessary, in order to disconnect the thill from the axle, to drop the thill to position with its tip end substantially touching the ground surface, the thill member of the coupling cannot possibly become separated from the axle member and, in fact, the forward pull exerted upon the thill member will only serve to more firmly hold the member in position with the wall of its socket 11 snugly engaging the head 7 so as to prevent rattling of the parts. In fact, even when the coupling is fully open or unlocked, as shown in Fig. 3 of the drawings, there is no possibility of the thill member thereof becoming disengaged from the axle member under ordinary driving conditions as under such conditions the thills never drop to even approximately the position above referred to. As a matter of fact, in order to disconnect the thill from the axle it is necessary to not only adjust the parts of the coupling to the position shown in Fig. 3 of the drawings but it is also necessary to drop the thills to the lowered position stated above, for the parts cannot be separated by merely lifting up upon the inner end of the thill inasmuch as the head 10 cannot be moved rearwardly beyond the position shown in Fig. 3 of the drawings because of its abutment against the forward arm of the clip 4 and in such position the head 7 cannot clear the socket 11.

It will be understood from the foregoing description of the invention that the use of bushings is entirely obviated.

Having thus described the invention, what it claimed as new is:

A thill coupling comprising an axle member and a thill member, the axle member including an attaching portion and a bearing element, the thill member having a head provided with a socket to receive the said bearing element, a cap plate pivoted to the said head and movable to position to close the said socket, an ear upon the thill member, a link pivoted at its inner end to the said ear, the said link at its pivoted end being beveled whereby the link may have swinging movement in a forward and upward direction and will be limited, by reason of the engagement of one end of its bevel against the face of the thill member, in its downward and rearward swinging movement beyond a predetermined position, and a locking element for the cap plate comprising a leaf spring bowed to form spaced arms one of which arms is pivotally connected to the outer end of the link and the other one of which arms is designed to bear against the outer side of the cap plate, in the locked position of the parts.

In testimony whereof I affix my signature.

WILLIAM A. BUCHANAN. [L. S.]

Copies of this patent may be obtained for five cents each, by addressing the "Commissioner of Patents, Washington, D. C."